Patented Feb. 16, 1926.

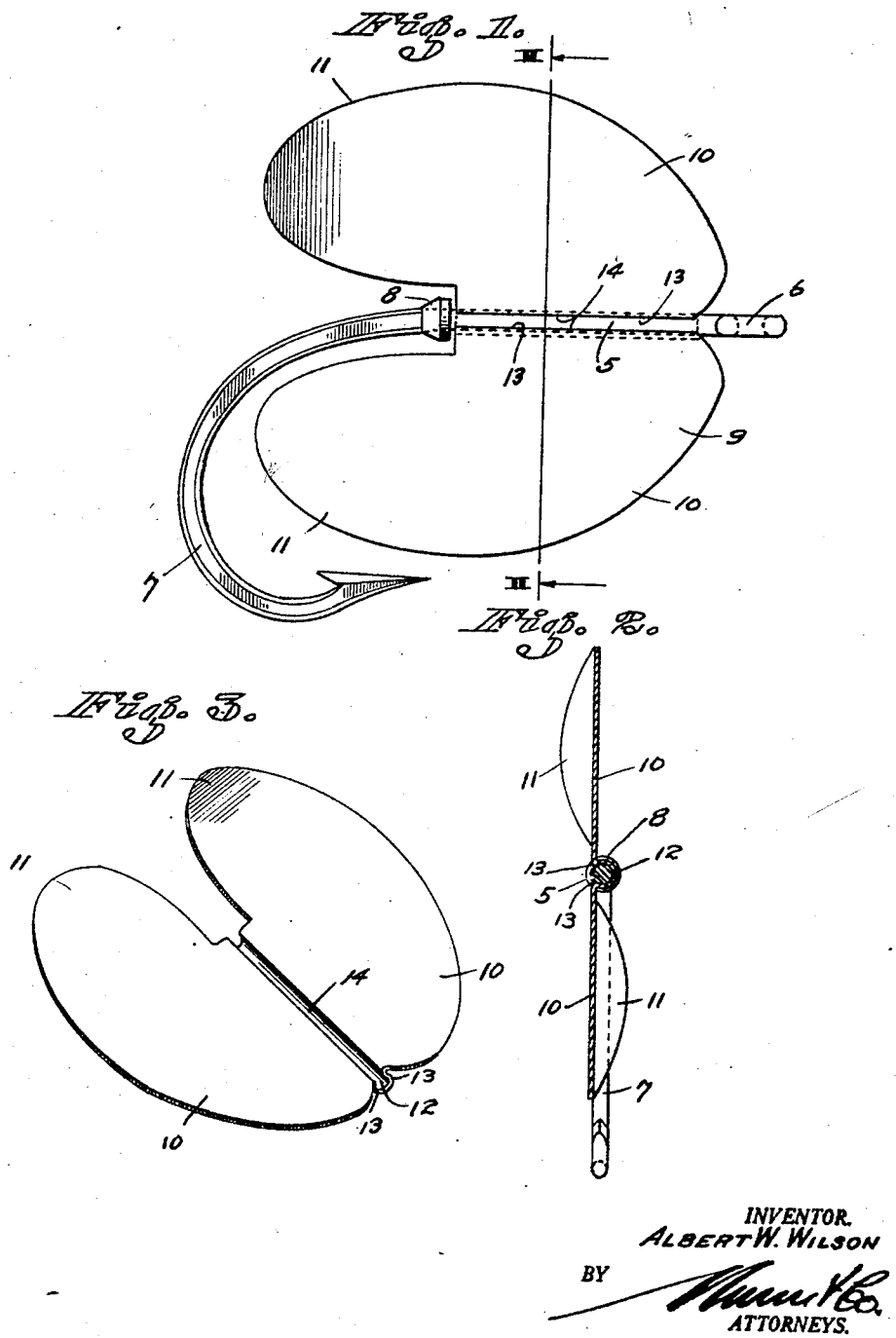

1,573,288

UNITED STATES PATENT OFFICE.

ALBERT W. WILSON, OF SAN FRANCISCO, CALIFORNIA.

TROLLING GEAR.

Application filed December 15, 1924. Serial No. 756,028.

*To all whom it may concern:*

Be it known that I, ALBERT W. WILSON, a citizen of the United States, and a resident of San Francisco, county of San Francisco, and State of California, have invented a new and useful Trolling Gear, of which the following is a specification.

This invention relates to trolling gears, and has for its primary object the provision of gear characterized by a hook having a spinner mounted directly upon its shank and adapted to function whereby its alluring qualities are most effective at or directly near the point of the hook.

Another object of the invention is to provide gear which may be satisfactorily used in either fresh or salt water and which consists of an organized arrangement of parts conducive to a properly balanced structure.

Another object of the invention is to provide a device of this character whose parts can be quickly assembled and operatively correlated with one another, thereby lessening the cost of manufacture of the device.

Another object of the invention is to provide a device of this character whereby the spinner can be connected with the shank of the hook without means of special fastenings.

A still further object of the invention is to provide gear consisting of an artificial destructible bait of spinner form which is adapted to function as a lure, and which, if grabbed by a fish, will be separated from the hook, leaving the latter intact with the line and enabling a new spinner to be substituted therefor at small cost and at utmost convenience to the fisherman.

A further object of the invention is to provide a spinner having a bendable or resilient portion adapted to be snapped into position with the shank of the hook and to freely revolve around the axis thereof between the point and the eye.

With the above and other objects in view which will appear as the nature of the invention is better understood, the same consists in the improved construction and novel arrangement of parts which will hereinafter be fully described and particularly pointed out in the claims.

In the accompanying drawings has been illustrated a single and preferred form of the invention, it being, however, understood that no limitations are necessarily made to the precise structural details therein exhibited, but that changes, alterations and modifications within the scope of the claims may be resorted to when desired.

Figure 1 is a view in side elevation of my improved gear;

Figure 2 is a section taken on line II—II of Figure 1; and

Figure 3 is a perspective view of the spinner.

In carrying the invention into practice use is made of a hook of substantially ordinary construction, the same having a straight shank portion 5 terminating at one end in an eye 6 and at its opposite end in the customary curved point 7. The shank is preferably provided with a stop shoulder 8. On this shank at one side of the stop shoulder is a spinner 9.

The spinner above referred to may be constructed of any suitable well known material, but in practice I find tin very desirable. It may be painted either on one or both sides, or it can be silvered or mirrored, as may be found most effective to enable the spinner to fully function as a lure. It may have one or a multiplicity of blades 10, two being shown in the present instance.

These blades are pitched in suitable manner so that the spinner will freely revolve around the axis of the shank 5. The blade, or blades, as the case may be, are relatively attenuated with respect to the length of the shank and as a matter of fact with respect to the entire hook structure and as shown in Figure 1 the blades are provided with extensions 11 which describe a circle directly within the plane of the point of the hook when the spinner is revolved, their distance with respect to the point being calculated so as not to retard free rotation. These extensions may be flexed to suit requirements, and pitched at the will of the operator so as to govern the speed of rotation of the spinner in the water.

The spinner is provided with a resilient bearing 12 consisting of a portion having compressible or bendable or relatively movable sides 13—13 separated by an entrance opening 14. The sides 13—13 are so positioned when the spinner is on the shank that the opening 14 is almost closed. The necessary clearance is provided between the shank and the walls of the bearing portion just referred to so that the spinner is adapted to properly rotate about the axis of the shank. In addition thereto there is such resiliency between the parts as to permit the spinner to be entirely separated from the shank of the hook if the spinner is grabbed by a fish.

In this manner, the essential element of the gear is in fact destructible. It is cheap to manufacture. It is not connected permanently to the shank, and if grabbed and taken by the fish the hook and its line remain intact, and it is only necessary for the fisherman to replace the old spinner by a new one. This can be done with ease, convenience and great dispatch. I find that by extending the portions 11 down toward the point and causing same to revolve around a circle within the plane of the point of the hook, a very effective lure is provided which attracts the fish to the point of the hook.

I have described an arrangement of spinner in combination with a single hook, but it shall be understood that in this respect I do not wish to limit myself, and that changes within the spirit of the hereto annexed claims can be made at will. I am particularly interested in the form and construction of gear embodying a spinner of destructible variety, one that is separable or detachable from the shank when ordinary pull is applied thereto when it is grabbed or snatched by a fish. Neither do I wish to limit myself to the kinds of materials employed, but, as stated, tin is found very useful. The spinners can be stamped from tin at comparatively low cost, and as this material is light in weight, it is most admirable for my purpose.

I have described that among other objects a feature of the invention resides in a perfectly balanced gear. In this respect, the spinner revolving around the axis of the shank, it follows that when the gear is launched, the point of the hook extends downward in the direction of the eye and it so underlies the spinner as to constitute a balance keel.

I claim:

1. A gear embodying a hook, a spinner, and a resilient bearing formed on the spinner and having separable connection with the shank.

2. A fish hook having a destructible spinner with resilient means to permit it to be torn from the hook when grabbed by a fish.

3. A hook, and a spinner mounted to revolve around the axis of the shank thereof and provided with resilient portions capable of relative separation and contraction with respect to the shank.

4. As a new article of manufacture, a spinner for fish hooks embodying a structure having a blade terminating in a laterally resilient bearing for the free reception of the shank of a hook.

5. As a new article of manufacture, a spinner for fish hooks embodying a structure having a blade terminating in a bearing for the free reception of the shank of a hook and including axially resilient walls capable of movement relatively toward and away from each other on the application of pressure thereto.

ALBERT W. WILSON.